C. B. MORSE.

RING SPINNING-FRAME.

No. 7,085. Reissued April 25, 1876.

WITNESSES

Wm A Stinkle

E C Davidson

INVENTOR

Cyrus B Morse.

By his Attorneys Wm D. Baldwin

Marcus S. Hopkins

THE NORRIS PETERS CO., PHOTO-LITHO., WASHINGTON, D. C.

UNITED STATES PATENT OFFICE.

CYRUS B. MORSE, OF RHINEBECK, NEW YORK.

IMPROVEMENT IN RING SPINNING-FRAMES.

Specification forming part of Letters Patent No. 76,798, dated April 14, 1868; reissue No. 6,348, dated March 23, 1875; reissue No. 7,085, dated April 25, 1876; application filed March 6, 1876.

*To all whom it may concern:*

Be it known that I, CYRUS B. MORSE, of Rhinebeck, in the county of Dutchess and State of New York, have invented certain new and useful Improvements in Ring Spinning Mechanism, of which the following is a specification:

My invention consists in devices for adjusting the lifting-rail of a ring spinning-frame, and in an adjustable ring-holder, to be supported by, and rest on, the lifting and ring rail.

Figure 1:
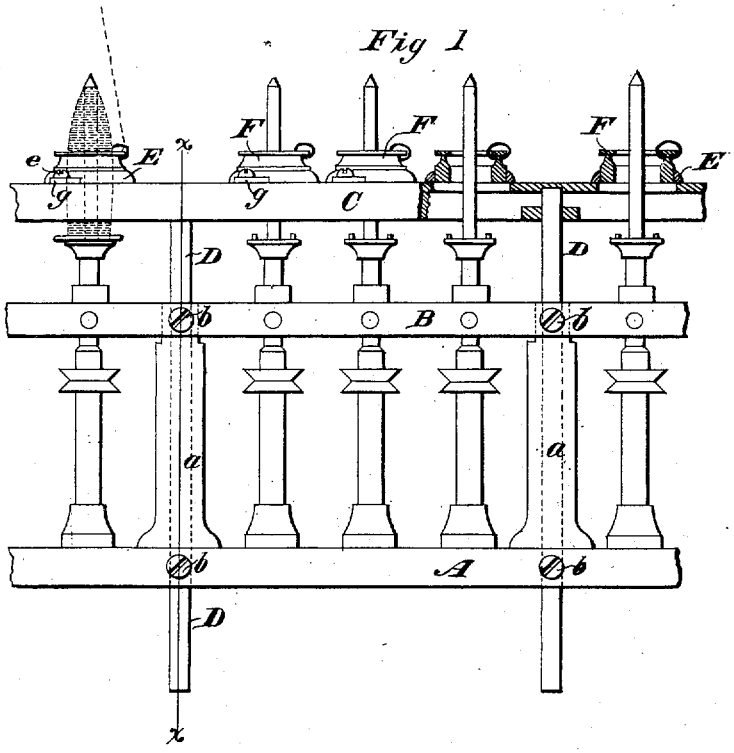
Figure 2:
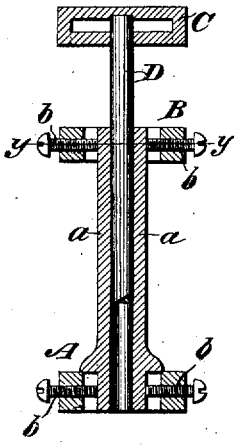
Figure 3:
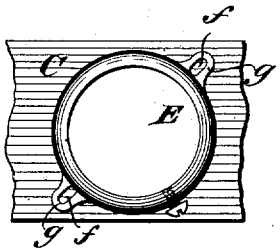
Figure 4:
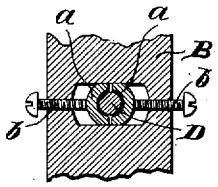

In the drawings, Figure 1 is a front view, partly in section, of a portion of a ring spinning-frame. Fig. 2 is a cross-section of the rails through the lifting and ring rail support, in the line *x x* of Fig. 1. Fig. 3 is a plan view of my improved ring-holder resting on a section of a continuous lifting and ring rail. Fig. 4 is a horizontal section through the bolster-rail, in the line *y y* of Fig. 2.

Similar letters of reference represent corresponding parts.

A represents the bottom or step rail of a ring spinning-frame; B, the bolster-rail; and C the lifting and ring rail. D D are lifting-rods, supported in two semicircular bearings, *a a*, Fig. 4, forming a split tube, and held in place in slots in the rails, and adjustable by set-screws *b b* on opposite sides of each rail.

By means of the long semicircular bearings uneven wear and displacement of the spindles are in a great measure prevented; and by means of the set-screws the lifting-rail can be adjusted back and forth, as may be required, should any derangement of the spindles occur.

E is my ring-holder, which is adjustably secured on the lifting and ring rail by screws *e* passing through the elongaged slots *f f* in the lugs *g g* of the holder. F is the ring set in the holder, and is held in place by the horizontal set-screw shown in Fig. 3. The slots in the lugs or projections of the ring-holders are not only elongated, as shown, but are made wider than the diameter of the holding-screws, so that by means of the holding-screws the ring-holder can be adjusted in any direction to center the ring around the spindle.

What I claim as my invention is—

1. The combination, substantially as described, with the continuous lifting and ring rail, provided with spindle-openings, of a holder for containing a spinning-ring, which holder is adjustable in position upon the rail, substantially as set forth.

2. The combination, substantially as described, with the continuous lifting and ring rail, provided with spindle-openings, of a holder for containing a spinning-ring, which holder is adjustable in position upon the rail, and a detachable ring carried by said holder, substantially as set forth.

3. The combination, substantially as described, with the continuous lifting and ring rail, provided with spindle-openings, of a holder for containing a spinning-ring, which holder is adjustable in position upon the rail, a detachable ring carried by said holder, and adjusting and holding screws passing into the ring-rail, substantially as set forth.

4. The tubular bearing, in combination with the slotted rails and lifting-rod, as and for the purposes set forth.

In testimony whereof I have hereunto subscribed my name.

CYRUS B. MORSE.

Witnesses:

J. HENRY HILL,

ASA W. RUGG.